3,137,872
FISHING FLOAT
William H. Edwards, 25 Blythewood Drive, and James T. Finley, 407 Piedmont Highway, both of Greenville, S.C.
Filed Dec. 10, 1962, Ser. No. 243,462
1 Claim. (Cl. 9—8.3)

This invention relates to fishing accessories and more especially to a float for carrying a light used in fishing.

Lights such as those used in night fishing include the gas lantern type. Heretofore, it has been necessary to suspend these lanterns from brackets carried by the fisherman's boat. This is not a very satisfactory arrangement in view of the fact that the lantern attracts bugs which are unpleasant to the fisherman, and much of the light from the lantern is cast back into the boat where it is not effective in the fishing operation. If one is fishing from a bridge, it has been necessary to lower this lantern close to the water on a line and often the lantern is lost in such lowering. By making it possible to float the lantern in the water away from the fisherman's boat, it is possible to attract an even greater number of insects which fly into the lantern and fall into the water without causing discomfort to the fisherman. This large number of insects result in the attraction of many small fish would would in turn attract a number of larger fish thus, greatly enhancing the effectiveness of the light. By thus placing the light close to the water, it is possible to see the small fish which may be caught with a net and used for bait.

Accordingly, it is an important object of this invention to provide a float for maintaining the lantern close to the water and away from the boat of the fisherman.

Another important object of the invention is to provide an effective float for a lantern which will maintain the lantern in stable position upon the water even though the water be rough and choppy.

Another object of the invention is to provide a float for a fishing lantern which may be attached to a cane and extended a given distance from the boat or the float may be allowed to drift and be held by a line. Such float may also be provided with an anchoring means to position it a given distance from a boat or other object.

Another object of the invention is to provide a lantern float which may be used to float any object which provides stability even in rough water.

Still another object of the invention is to provide a lantern float which may be folded to form a table to hold the lantern for better lighting in camp.

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIGURE 1 is a perspective view, with parts broken away, illustrating a float constructed in accordance with the present invention holding a gas lantern, and FIGURE 2 is a side elevation of the float illustrated in FIGURE 1 revolved 45 degrees to the right, and floating in the water.

The drawing illustrates a float for carrying a gas lantern and the like, for night fishing and the like which includes a support A. Means B in the form of adjustable brackets are provided for removably fixing the light with respect to the support A. A plurality of circumferentially spaced floating pontoons C are carried by the support and extend radially therefrom. It is desirable that the pontoons C contain a suitable cellular, foam material such as polyethylene and that the supporting structure therefor be constructed of wood. Thus, the pontoons are provided with sufficient weight to float low in the water, as illustrated in FIGURE 2, so that the support A and the light carried thereby, is floated close to and stabilized upon the water.

The support A is illustrated as being rectangular and flat in configuration. The fishing lamp 10 is supported thereby and fixed thereon by suitable bracket means B. The base of the lamp 10 includes container 11 which is filled with white gasoline fuel and the like through a port having a top 12. The usual pumping means 13 is provided for creating a pressure in the base container 11 and a valve 14 may be turned to permit the gas under pressure to flow into the globes 15. An intermediate portion of the lamp 16 is provided with apertures 16a for permitting air to enter the glass enclosure 17 for the globes 15. The knob 18 may be turned for operating the usual needle valve (not shown) for cleaning the valve feeding fuel to the globes 15. A lamp shade 19 is provided to fit over a top 20 of the lamp. The top 20 contains air apertures 20a also permitting air to enter the glass casing 17. A handle 21 is provided for carrying the lamp. When the lamp 10 is fixed in the brackets B, the entire arrangement including the float may be carried by the handle 21.

The brackets B each include a flat base 22 having an elongated slot 23 therein, through which means carrying a wingnut 24 for fixing the position of the base 22 with respect to the support A. An upturned portion 25 of the bracket is suitably fixed as by welding (not shown) to an arcuate segment 26. The arcuate segments 26 oppose each other so as to confine the base 11 of the lamp therebetween.

Adjacent each of the corners of the base A, an outwardly extended elongated block 27 is provided to support one of the pontoons C. It is important to note that the blocks 27 are circumferentially spaced about the support A and extend radially outwardly thereof. Each of the blocks 27 is securely fixed to the bottom of the support A by suitable fastening means such as glue (not shown). Each of the circumferentially spaced radially extending pontoons C has a bifurcated end portion adjacent the support A which includes members 28. These members 28 encompass the blocks 27 on both sides thereof, and a pin 29 is provided for pivotally carrying the pontoon 30. Preferably, there are four such pontoons, one carried adjacent each corner of the support A and extend outwardly therefrom so as to provide stability for the float when in the water. The pontoons 30 are preferably constructed of wood and are hollow so as to contain a cellular material, preferably in the form of polyethylene 31.

It will be noted by reference to FIGURE 1, that the pontoons may be depressed and may be lowered to a vertical position wherein the pontoons C may serve as suitable table legs. By referring to FIGURE 2, it will be noted that the pontoons are in horizontally extended position and that the water W comes nearly to the top of the pontoons. In order to maintain the float a suitable distance away from the boat an I-bolt 32 is provided so that a pole P may be attached thereto by a line 33. If desired, a suitable anchor dropping means which could be actuated by engagement with a pole may be mounted upon the base A.

While a preferred embodiment of the invention has been described using specific terms, such description is for illustrative purposes only, and it is to be understood

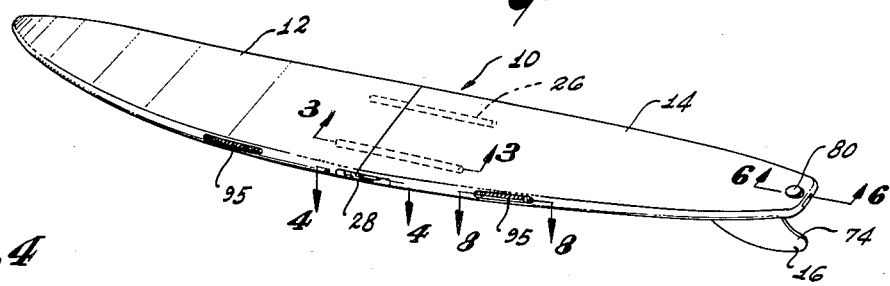
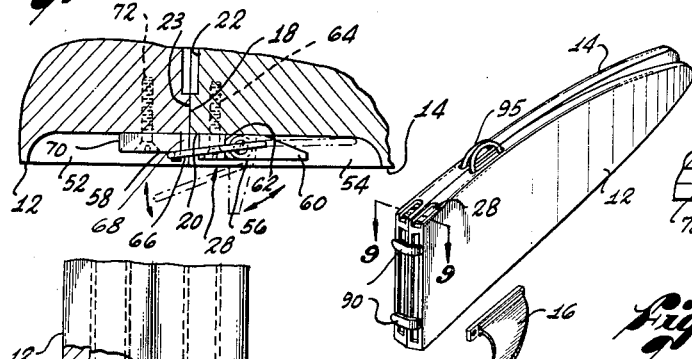
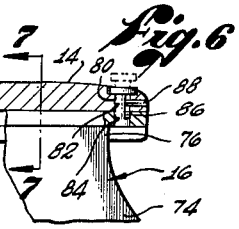
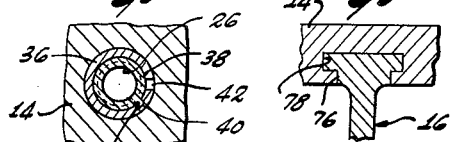
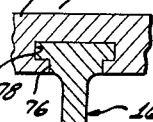
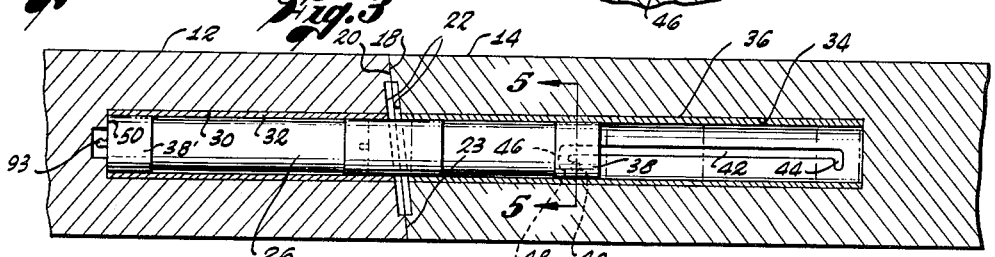
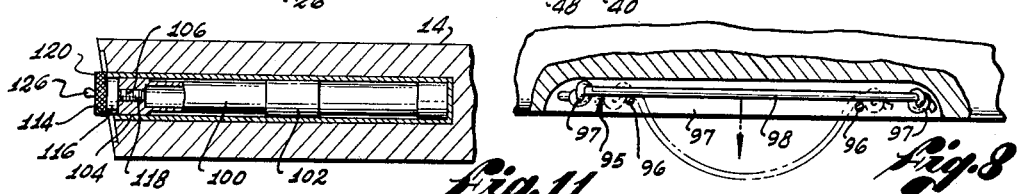
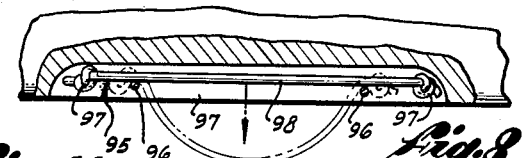
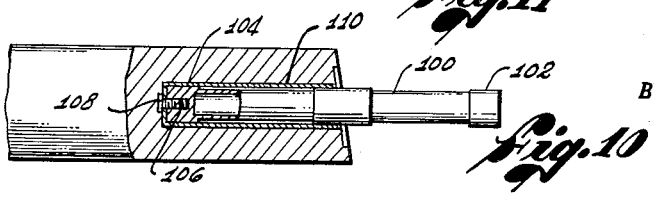
INVENTOR.
MARIO GARROLINI

United States Patent Office 3,137,873
Patented June 23, 1964

3,137,873
COLLAPSIBLE SURFBOARD
Mario Garrolini, 3524 Burritt Way, La Crescenta, Calif., assignor of fifteen percent to Lillian Huntley, La Crescenta, Calif.
Filed July 17, 1961, Ser. No. 124,656
2 Claims. (Cl. 9—310)

This invention relates to water sports devices, and more particularly to a surfboard of the type which is adapted to be collapsed into a package for convenient transporting and storing.

In order that a surfboard be best suited for its intended purpose, it is constructed approximately ten feet long. Because of this considerable length, problems are encountered in transporting and storing.

These transportation and storage problems are intensified by virtue of the surfboard necessarily being provided with a skeg or keel projecting downwardly from its lower surface adjacent the rear end thereof. The skeg is required in order that the surfboard will have sufficient stability in the water. Moreover, the cross sectional area of the skeg must be relatively small so that no appreciable resistance is created to movement through the water.

It will be appreciated that since the skeg projects downwardly from an otherwise generally flat surface and since it is relatively thin in cross section, it is highly susceptible to damage, particularly during transporting and storing of the surfboard.

With the foregoing in mind, it is a primary object of the invention to provide a surfboard constructed in a plurality of separate and lightweight portions adapted to be assembled for use and to be collapsed into a package for convenient transporting and storing.

A further object is to provide a surfboard of the type described in which the means for joining the separable portions are housed entirely within the confines of the surfboard when the portions are assembled for use, and in which the joining means are adapted to be retracted entirely within the confines of the separable portions when the surfboard is collapsed for transporting and storing.

Another object of the invention is to provide a surfboard of the type described in which the means for joining the separable portions are durable and reliable in operation and relatively light in weight.

A still further object of the invention is to provide a surfboard of the type described which may quickly and easily be assembled for use and collapsed into a package for convenient transporting and storing.

Still another object is to provide a collapsible surfboard which, when assembled, is well balanced and stable in the water.

These and other objects and advantages of the invention will be better understood by referring to the following detailed description taken in conjunction with the accompanying drawings in which:

FIGURE 1 is a perspective view of the surfboard of the invention in an assembled condition;

FIGURE 2 is a perspective view of the surfboard in a collapsed condition;

FIGURE 3 is a longitudinal partial section on an enlarged scale taken on the line 3—3 of FIGURE 1, certain parts being shown in full for reasons of added clarity;

FIGURE 4 is a partial section on an enlarged scale taken on line 4—4 of FIGURE 1;

FIGURE 5 is a partial section taken on the line 5—5 of FIGURE 3;

FIGURE 6 is a partial section on an enlarged scale taken on the line 6—6 of FIGURE 1;

FIGURE 7 is a partial section taken on the line 7—7 of FIGURE 6;

FIGURE 8 is a partial section taken on the line 8—8 of FIGURE 1;

FIGURE 9 is a partial section taken on the line 9—9 of FIGURE 2;

FIGURE 10 is a partial section, similar to FIGURE 3, showing an alternate form of the invention, the various parts being illustrated in the positions occupied when the surfboard is in an assembled condition; and FIGURE 11 is a partial section, similar to FIGURE 10, showing the various parts in the positions occupied when the surfboard is collapsed.

Referring to the drawing and in particular to FIGURE 1 thereof, the surfboard of the invention is indicated by the reference numeral 10. The surfboard 10 includes, generally, separable front and rear body portions 12 and 14, respectively, adapted to be joined together in a manner to be described in detail below, and a skeg or keel 16 detachably mounted on the rear end of the rear body portion 14.

Preferably, the body portions 12 and 14 are formed of a rigid plastic foam, which may be conveniently molded into the desired shapes and which is light in weight. Subsequent to forming the body portions, all exterior surfaces are coated with a suitable glass fiber material to provide a smooth, durable finish, which also is pleasing in appearance.

As may be seen in FIGURES 1 and 3, the body portions 12 and 14 are adapted to be arranged in an assembled condition immediately adjacent to and in longitudinal alignment with one another. When so arranged, the ends 18 and 20 of the body portions 12 and 14, respectively, mate with one another. In order that the entire end surfaces need not be held to close tolerances, each of the ends 18 and 20 is preferably formed with a recessed central section 22. On the other hand, a marginal edge section 23 of each end is held to a fairly close tolerance, so that it abuts flush with the corresponding marginal end section of the opposite end, as illustrated in FIGURE 3, when the body portions are arranged in an assembled condition. Recessing the central sections 22 of each end in the manner described in no way impairs the strength of the resulting connection.

In the illustrative embodiment, the mating ends 18 and 20 are formed at an angle slightly offset from perpendicular relation to the upper and lower surfaces of their respective body portions. The reason for this angular offsetting is to reduce the apparent extent of a crack at the junction of the body portions. Moreover, such offsetting serves to prevent the assembled portions 12 and 14 from rotating relative to ane another about a longitudinal axis of the surfboard, as will be more fully explained below.

The separable body portions 12 and 14 are maintained in their assembled condition, illustrated in FIGURE 1, by means of a pair of telescoping shafts 26 and a pair of latch means 28.

In order to telescopically mount the shafts 26, the front body portion 12 is provided with a first pair of laterally spaced, parallel bores 30. Each of the bores 30 extends longitudinally of the body portion 12 and opens to the central recess section 22 of the end 18. A first pair of bearing sleeves 32, preferably formed of aluminum or other suitable material, which si strong and durable, yet light in weight, are secured, one each, in the bores 30. A convenient method of securing the sleeves 32 in the body portion 12 is to position them as desired in the mold when forming the body portion.

The rear body portion 14 is furnished with a second pair of parallel bores 34 mounting a second pair of bearing sleeves 36. As in the case of the front body portion 12, each of the bores 34 (and its associated sleeve 36) extends longitudinally of the body portion 14 and opens to the central recess section 22 of the end 20. Further, the bores 34 are arranged so as to be axially aligned with corresponding ones of the bores 30 in the opposite body portion when the portions 12 and 14 are arranged in their assembled condition. The sleeves 36, like sleeves 32, advantageously may be secured in place by molding the rear body portion 14 around them.

As shown in FIGURE 3, the sleeves 36 are considerably longer than the sleeves 32. The reason for this variation in length will become apparent as the description proceeds.

The shafts 26, in the illustrative embodiment, are formed of aluminum tubing having an outside diameter somewhat smaller than the inside diameter of the sleeves 32 and 36. The shafts 26 are each provided with a plurality of longitudinally spaced bearings 38 that engage the walls of sleeves 32 and 36 in a close sliding fit. Preferably, the bearings 38 are constructed of a glass fiber material which readily may be machined to the desired diameter and which is non-corrosive and, in effect, self-lubricating. Such a shaft configuration is preferred over a uniform diameter member for the reason that grains of sand or other foreign matter in the sleeves 32 and 36 are pushed along the sleeves between the bearings 38. On the other hand, in the case of a uniform diameter shaft, the sand would be trapped between the contacting surfaces, resulting in binding of the shaft or at least scratching the contacting surfaces.

The shafts 26 are telescopically mounted, one each, in the second pair of bearing sleeves 36 in the rear body portion 14. Movement of the shafts 26 is from retracted positions, shown in phantom lines in FIGURE 3, wherein their outer ends terminate substantially flush with the end 20 of the rear body portion 14, to extended positions, wherein they extend exteriorly of that body portion. In their extended positions, the shafts 26 are adapted to be received in corresponding ones of the bearing sleeves 32 in the front body portion 12, when the body portions are arranged in an assembled condition. With the shafts 26 entered into the aligned pairs of sleeves 32 and 36 and with the marginal edge sections 23 of the ends 18 and 20 abutting one another, the body portions are held against lateral movement, tilting, or rotation, with respect to one another. That is to say, when the body portions are joined together in the manner described, the individual portions are only movable longitudinally away from one another.

Means are provided on the shafts 26 and the sleeves 36 for selectively locking the shafts in their extended and their retracted positions. Each locking means includes a pin 40 (FIGURE 5) mounted in the rear end of each of the shafts 26 and having a portion projecting radially outwardly of the periphery of its associated shaft. The pin 40 rides in a longitudinal slot 42 in the sleeve 36 as the shaft is moved longitudinally of the sleeve. Preferably, the slot 42 extends to the forward end of the sleeve 36 adjacent the end 20 of the body portion 14 so that the shaft 26 may be completely removed from the body portion 14 for cleaning both the shaft and the sleeve. Joining the slot 42 at longitudinally spaced positions are a pair of transverse slots 44 and 46. Shaft locking is accomplished by rotating the shaft 26 so as to move the pins 40 from the longitudinal slot 42 into one or the other of the transverse slots 44 and 46.

The rear slot 44 is located so that the shaft 26 is positioned in its retracted position when the pin 40 is entered therein, and the forward slot 46 is positioned so that the shaft is in its extended position when the pin is rotated therein. As may be seen in FIGURE 3, the forward slot 46 is curved rearwardly, as at 48. The purpose of this rearwardly slot portion is to prevent the pin 40 from inadvertently rotating back into the longitudinal slot 42 and thereby unlocking the shaft. The pin 40 is maintained in the rearward slot portion 48 by virtue of the forward end of the shaft 26 abutting the shoulder 50 in the front body portion 12 when the surfboard is assembled.

In order to hold the assembled body portions 12 and 14 from moving longitudinally away from one another, the latch means 28 are provided on opposite sides of the surfboard. It is desirable that no parts of the surfboard project outwardly of its exterior surface. Accordingly, pairs of recessed grooves 52 and 54 are provided in the opposite sides of the body portions 12 and 14, respectively, for mounting the latch means. As shown in FIGURE 4, the grooves 52 and 54 open to the ends 18 and 20 of their respective body portions and are aligned with one another when the surfboard is assembled.

Referring to FIGURE 4, each latch means 28 includes an over-center type latch 56 mounted on the rear body portion 14 within the groove 54, and a keeper 58 mounted on the front body portion 12 within the groove 52. More specifically, the latch 56 comprises an arm 60 pivotally mounted on a bracket 62 which, in turn, is screwed to the rear body portion, as at 64. A loop or hook 66 is pivotally mounted on the arm 60 at a point spaced from the pivotal connection of the arm and bracket.

The keeper 58 comprises an outwardly projecting post 68, and an integral mounting bracket 70 which is joined to the front body portion by a screw 72.

Each latch means 28 is engaged by pivoting the arm 60 outwardly to the position shown in phantom lines in FIGURE 4. The loop 66 is engaged over the keeper post 68 and the arm 60 is then pivoted back to its latching position, illustrated in full lines in FIGURE 4. By virtue of the relative locations of the pivotal connections of the arm and bracket, and the loop and arm, the loop moves to the right in FIGURE 4 as the arm 60 is pivoted to its latching position. Such movement results in clamping of the body portions 12 and 14 together. When the arm is moved completely into its latching position, the loop 66 is slightly over-center. That is, the loop 66 is pivoted slightly inwardly of the pivotal connection of the arm and bracket. As is well known, such over-center action serves to maintain the latch in its engaged position.

As noted above, the skeg 16 is removably mounted adjacent the rear end of the rear body portion 14. The skeg 16 is preferably constructed of aluminum and may be conveniently formed by casting. It will be noted that the lower projecting portion 74 of the skeg is tapered rearwardly in the conventional manner and its upper section 76 is T-shaped. Referring to FIGURE 7, a T-shaped slot 78 is provided in the rear end of the rear body portion 14, the slot being adapted to slidably receive the upper T-shaped section 76 of the skeg.

In order to maintain the skeg 16 in assembly with the body portion 14, a locking pin 80 is provided (FIGURE 6). The pin 80 is slidably movable in a bore 82 in the body portion 14 from a lower limiting or locking position to an upper limiting or unlocking position, shown in full and in phantom lines, respectively, in FIGURE 6. A vertical bore 84 is provided in the upper section 76 of the skeg 16, the bore 84 being aligned with the bore 82 in the body portion 14 when the skeg is in its assembled position. The pin 80 is then moved downwardly to its locking position, wherein it frictionally engages in the skeg bore 84 to lock the skeg in assembly with the body portion 14.

It is desirable that the locking pin 80 be permanently retained on the rear body portion. To accomplish this, a portion of the shank of pin 80 is cutaway, as at 86. A retainer pin 88 is secured by a driving fit in a cooperating bore in the body portion 14 and has a portion projecting inwardly to the bore 82 and engaging the cutaway portion of the shank. Because of this engagement, the locking pin 80 is movable only between the limiting positions established by the cutaway portion 86.

Assuming the surfboard to be assembled for use, it is collapsed to the condition illustrated in FIGURE 2 in the following manner. The skeg 16 may first be removed